United States Patent
Bertero et al.

(10) Patent No.: US 9,001,630 B1
(45) Date of Patent: Apr. 7, 2015

(54) ENERGY ASSISTED MAGNETIC RECORDING MEDIUM CAPABLE OF SUPPRESSING HIGH DC READBACK NOISE

(71) Applicant: Western Digital Technologies, Inc., Irvine, CA (US)

(72) Inventors: Gerardo A. Bertero, Redwood City, CA (US); Michael Alex, Fremont, CA (US); Christopher B. Wolf, San Jose, CA (US); Eric J. Champion, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/260,512

(22) Filed: Apr. 24, 2014

Related U.S. Application Data

(62) Division of application No. 13/042,840, filed on Mar. 8, 2011, now Pat. No. 8,743,666.

(51) Int. Cl.
| | |
|---|---|
| *G11B 11/00* | (2006.01) |
| *G11B 5/64* | (2006.01) |
| *G11B 5/00* | (2006.01) |
| *G11B 20/10* | (2006.01) |

(52) U.S. Cl.
CPC .. *G11B 5/64* (2013.01); *G11B 5/00* (2013.01); *G11B 20/10481* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,481,410 | A | 1/1996 | Osato et al. |
| 5,512,366 | A | 4/1996 | Nakaki et al. |
| 5,663,935 | A | 9/1997 | Nishimura |
| 6,013,161 | A | 1/2000 | Chen et al. |
| 6,063,248 | A | 5/2000 | Bourez et al. |
| 6,068,891 | A | 5/2000 | O'Dell et al. |
| 6,086,730 | A | 7/2000 | Liu et al. |
| 6,099,981 | A | 8/2000 | Nishimori |
| 6,103,404 | A | 8/2000 | Ross et al. |
| 6,117,499 | A | 9/2000 | Wong et al. |
| 6,136,403 | A | 10/2000 | Prabhakara et al. |
| 6,143,375 | A | 11/2000 | Ross et al. |
| 6,145,849 | A | 11/2000 | Bae et al. |
| 6,146,737 | A | 11/2000 | Malhotra et al. |
| 6,149,696 | A | 11/2000 | Jia |
| 6,150,015 | A | 11/2000 | Bertero et al. |

(Continued)

FOREIGN PATENT DOCUMENTS

| | | |
|---|---|---|
| JP | 2003085702 | 3/2003 |

OTHER PUBLICATIONS

Ferrenberg, Alan M. and D. P. Landau, Monte Carlo study of phase transitions in ferromagnetic bilayers, Center for Simulational Physics, The University of Georgia, Athens, Georgia 30602, J. Appl. Phys., vol. 70, No. 10, Nov. 15, 1991, pp. 2615-2617.

(Continued)

*Primary Examiner* — Tan X Dinh

(57) ABSTRACT

A perpendicular magnetic recording (PMR) disk used in energy assisted magnetic recording drives is described. The PMR disk includes a substrate, a magnetic recording layer disposed above the substrate, an exchange coupling layer disposed above the magnetic recording layer, and a capping layer disposed above the exchange coupling layer. The capping layer has a Curie temperature greater than the Curie temperature of the magnetic recording layer.

2 Claims, 5 Drawing Sheets

(56) References Cited

U.S. PATENT DOCUMENTS

| | | | |
|---|---|---|---|
| 6,156,404 | A | 12/2000 | Ross et al. |
| 6,159,076 | A | 12/2000 | Sun et al. |
| 6,164,118 | A | 12/2000 | Suzuki et al. |
| 6,200,441 | B1 | 3/2001 | Gornicki et al. |
| 6,200,673 | B1 | 3/2001 | Miyamoto et al. |
| 6,204,995 | B1 | 3/2001 | Hokkyo et al. |
| 6,206,765 | B1 | 3/2001 | Sanders et al. |
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,388,956 | B1 | 5/2002 | Mori et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,468,670 | B1 | 10/2002 | Ikeda et al. |
| 6,482,330 | B1 | 11/2002 | Bajorek |
| 6,482,505 | B1 | 11/2002 | Bertero et al. |
| 6,495,252 | B1 | 12/2002 | Richter et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,551,728 | B1 | 4/2003 | Acharya et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,707,766 | B2 | 3/2004 | Mori et al. |
| 6,730,420 | B1 | 5/2004 | Bertero et al. |
| 6,743,528 | B2 | 6/2004 | Suekane et al. |
| 6,754,020 | B2 | 6/2004 | Hikosaka et al. |
| 6,759,138 | B2 | 7/2004 | Tomiyasu et al. |
| 6,778,353 | B1 | 8/2004 | Harper |
| 6,795,274 | B1 | 9/2004 | Hsieh et al. |
| 6,834,026 | B2 | 12/2004 | Fullerton et al. |
| 6,855,232 | B2 | 2/2005 | Jairson et al. |
| 6,857,937 | B2 | 2/2005 | Bajorek |
| 6,881,497 | B2 | 4/2005 | Coffey et al. |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,060,375 | B2 | 6/2006 | Lee et al. |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,582,368 | B2 | 9/2009 | Berger et al. |
| 7,588,841 | B2 | 9/2009 | Berger et al. |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,678,476 | B2 | 3/2010 | Weller et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,764,454 | B2 * | 7/2010 | Roshchin et al. .......... 369/13.33 |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |

(56) References Cited

U.S. PATENT DOCUMENTS

| | | | |
|---|---|---|---|
| 8,101,054 B2 | 1/2012 | Chen et al. | |
| 8,110,298 B1 * | 2/2012 | Choe et al. ............... 428/827 |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 | 3/2012 | Umezawa et al. | |
| 8,163,093 B1 | 4/2012 | Chen et al. | |
| 8,171,949 B1 | 5/2012 | Lund et al. | |
| 8,173,282 B1 | 5/2012 | Sun et al. | |
| 8,178,480 B2 | 5/2012 | Hamakubo et al. | |
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,298,609 B1 | 10/2012 | Liew et al. | |
| 8,298,689 B2 | 10/2012 | Sonobe et al. | |
| 8,309,239 B2 | 11/2012 | Umezawa et al. | |
| 8,316,668 B1 | 11/2012 | Chan et al. | |
| 8,331,056 B2 | 12/2012 | O'Dell | |
| 8,354,618 B1 | 1/2013 | Chen et al. | |
| 8,367,228 B2 | 2/2013 | Sonobe et al. | |
| 8,383,209 B2 | 2/2013 | Ayama | |
| 8,394,243 B1 | 3/2013 | Jung et al. | |
| 8,397,751 B1 | 3/2013 | Chan et al. | |
| 8,399,809 B1 | 3/2013 | Bourez | |
| 8,402,638 B1 | 3/2013 | Treves et al. | |
| 8,404,056 B1 | 3/2013 | Chen et al. | |
| 8,404,369 B2 | 3/2013 | Ruffini et al. | |
| 8,404,370 B2 | 3/2013 | Sato et al. | |
| 8,406,918 B2 | 3/2013 | Tan et al. | |
| 8,414,966 B2 | 4/2013 | Yasumori et al. | |
| 8,425,975 B2 | 4/2013 | Ishiyama | |
| 8,431,257 B2 | 4/2013 | Kim et al. | |
| 8,431,258 B2 | 4/2013 | Onoue et al. | |
| 8,453,315 B2 | 6/2013 | Kajiwara et al. | |
| 8,488,276 B1 | 7/2013 | Jung et al. | |
| 8,491,800 B1 | 7/2013 | Dorsey | |
| 8,492,009 B1 | 7/2013 | Homola et al. | |
| 8,492,011 B2 | 7/2013 | Itoh et al. | |
| 8,496,466 B1 | 7/2013 | Treves et al. | |
| 8,517,364 B1 | 8/2013 | Crumley et al. | |
| 8,517,657 B2 | 8/2013 | Chen et al. | |
| 8,524,052 B1 | 9/2013 | Tan et al. | |
| 8,530,065 B1 | 9/2013 | Chernyshov et al. | |
| 8,546,000 B2 | 10/2013 | Umezawa | |
| 8,551,253 B2 | 10/2013 | Na'im et al. | |
| 8,551,627 B2 | 10/2013 | Shimada et al. | |
| 8,556,566 B1 | 10/2013 | Suzuki et al. | |
| 8,559,131 B2 | 10/2013 | Masuda et al. | |
| 8,562,748 B1 | 10/2013 | Chen et al. | |
| 8,565,050 B1 | 10/2013 | Bertero et al. | |
| 8,570,844 B1 | 10/2013 | Yuan et al. | |
| 8,580,410 B2 | 11/2013 | Onoue | |
| 8,584,687 B1 | 11/2013 | Chen et al. | |
| 8,591,709 B1 | 11/2013 | Lim et al. | |
| 8,592,061 B2 | 11/2013 | Onoue et al. | |
| 8,596,287 B1 | 12/2013 | Chen et al. | |
| 8,597,723 B1 | 12/2013 | Jung et al. | |
| 8,603,649 B2 | 12/2013 | Onoue | |
| 8,603,650 B2 | 12/2013 | Sonobe et al. | |
| 8,605,388 B2 | 12/2013 | Yasumori et al. | |
| 8,605,555 B1 | 12/2013 | Chernyshov et al. | |
| 8,608,147 B1 | 12/2013 | Yap et al. | |
| 8,609,263 B1 | 12/2013 | Chernyshov et al. | |
| 8,619,381 B2 | 12/2013 | Moser et al. | |
| 8,623,528 B2 | 1/2014 | Umezawa et al. | |
| 8,623,529 B2 | 1/2014 | Suzuki | |
| 8,634,155 B2 | 1/2014 | Yasumori et al. | |
| 8,658,003 B1 | 2/2014 | Bourez | |
| 8,658,292 B1 | 2/2014 | Mallary et al. | |
| 8,665,541 B2 | 3/2014 | Saito | |
| 8,668,953 B1 | 3/2014 | Buechel-Rimmel | |
| 8,674,327 B1 | 3/2014 | Poon et al. | |
| 8,685,214 B1 | 4/2014 | Moh et al. | |
| 8,696,404 B2 | 4/2014 | Sun et al. | |
| 8,711,499 B1 | 4/2014 | Desai et al. | |
| 8,743,666 B1 | 6/2014 | Bertero et al. | |
| 8,758,912 B2 | 6/2014 | Srinivasan et al. | |
| 8,787,124 B1 | 7/2014 | Chernyshov et al. | |
| 8,787,130 B1 | 7/2014 | Yuan et al. | |
| 8,791,391 B2 | 7/2014 | Bourez | |
| 8,795,765 B2 | 8/2014 | Koike et al. | |
| 8,795,790 B2 | 8/2014 | Sonobe et al. | |
| 8,795,857 B2 | 8/2014 | Ayama et al. | |
| 2001/0051287 A1 | 12/2001 | Kikitsu et al. | |
| 2002/0060883 A1 | 5/2002 | Suzuki | |
| 2002/0191320 A1 | 12/2002 | Coffey et al. | |
| 2003/0022024 A1 | 1/2003 | Wachenschwanz | |
| 2003/0202430 A1 * | 10/2003 | Nishikawa ............... 369/13.33 |
| 2004/0022387 A1 | 2/2004 | Weikle | |
| 2004/0132301 A1 | 7/2004 | Harper et al. | |
| 2004/0202793 A1 | 10/2004 | Harper et al. | |
| 2004/0202865 A1 | 10/2004 | Homola et al. | |
| 2004/0209123 A1 | 10/2004 | Bajorek et al. | |
| 2004/0209470 A1 | 10/2004 | Bajorek | |
| 2005/0036223 A1 | 2/2005 | Wachenschwanz et al. | |
| 2005/0142990 A1 | 6/2005 | Homola | |
| 2005/0150862 A1 | 7/2005 | Harper et al. | |
| 2005/0151282 A1 | 7/2005 | Harper et al. | |
| 2005/0151283 A1 | 7/2005 | Bajorek et al. | |
| 2005/0151300 A1 | 7/2005 | Harper et al. | |
| 2005/0155554 A1 | 7/2005 | Saito | |
| 2005/0167867 A1 | 8/2005 | Bajorek et al. | |
| 2005/0263401 A1 | 12/2005 | Olsen et al. | |
| 2006/0147758 A1 | 7/2006 | Jung et al. | |
| 2006/0181697 A1 | 8/2006 | Treves et al. | |
| 2006/0207890 A1 | 9/2006 | Staud | |
| 2006/0269797 A1 * | 11/2006 | Lu et al. ............... 428/834 |
| 2007/0070549 A1 | 3/2007 | Suzuki et al. | |
| 2007/0172705 A1 * | 7/2007 | Weller et al. ............... 369/13.33 |
| 2007/0245909 A1 | 10/2007 | Homola | |
| 2008/0075845 A1 | 3/2008 | Sonobe et al. | |
| 2008/0084627 A1 * | 4/2008 | Roshchin et al. ............... 369/13.33 |
| 2008/0093760 A1 | 4/2008 | Harper et al. | |
| 2009/0040644 A1 | 2/2009 | Lu et al. | |
| 2009/0117408 A1 | 5/2009 | Umezawa et al. | |
| 2009/0136784 A1 | 5/2009 | Suzuki et al. | |
| 2009/0169922 A1 | 7/2009 | Ishiyama | |
| 2009/0191331 A1 | 7/2009 | Umezawa et al. | |
| 2009/0202866 A1 | 8/2009 | Kim et al. | |
| 2009/0311557 A1 | 12/2009 | Onoue et al. | |
| 2010/0110576 A1 | 5/2010 | Akagi et al. | |
| 2010/0143752 A1 | 6/2010 | Ishibashi et al. | |
| 2010/0190035 A1 | 7/2010 | Sonobe et al. | |
| 2010/0196619 A1 | 8/2010 | Ishiyama | |
| 2010/0196740 A1 | 8/2010 | Ayama et al. | |
| 2010/0209601 A1 | 8/2010 | Shimokawa et al. | |
| 2010/0215992 A1 | 8/2010 | Horikawa et al. | |
| 2010/0232065 A1 | 9/2010 | Suzuki et al. | |
| 2010/0247965 A1 | 9/2010 | Onoue | |
| 2010/0261039 A1 | 10/2010 | Itoh et al. | |
| 2010/0279151 A1 | 11/2010 | Sakamoto et al. | |
| 2010/0300884 A1 | 12/2010 | Homola et al. | |
| 2010/0304186 A1 | 12/2010 | Shimokawa | |
| 2011/0097603 A1 | 4/2011 | Onoue | |
| 2011/0097604 A1 | 4/2011 | Onoue | |
| 2011/0171495 A1 | 7/2011 | Tachibana et al. | |
| 2011/0206947 A1 | 8/2011 | Tachibana et al. | |
| 2011/0211271 A1 * | 9/2011 | Ng et al. ............... 369/13.33 |
| 2011/0212346 A1 | 9/2011 | Onoue et al. | |
| 2011/0223446 A1 | 9/2011 | Onoue et al. | |
| 2011/0235205 A9 | 9/2011 | Lu et al. | |
| 2011/0244119 A1 | 10/2011 | Umezawa et al. | |
| 2011/0299194 A1 | 12/2011 | Aniya et al. | |
| 2011/0311841 A1 | 12/2011 | Saito et al. | |
| 2012/0069466 A1 | 3/2012 | Okamoto et al. | |
| 2012/0070692 A1 | 3/2012 | Sato et al. | |
| 2012/0077060 A1 | 3/2012 | Ozawa | |
| 2012/0127599 A1 | 5/2012 | Shimokawa et al. | |
| 2012/0127601 A1 | 5/2012 | Suzuki et al. | |
| 2012/0129009 A1 | 5/2012 | Sato et al. | |
| 2012/0140359 A1 | 6/2012 | Tachibana | |
| 2012/0141833 A1 | 6/2012 | Umezawa et al. | |
| 2012/0141835 A1 | 6/2012 | Sakamoto | |

(56) References Cited

U.S. PATENT DOCUMENTS

| | | | |
|---|---|---|---|
| 2012/0148875 A1 | 6/2012 | Hamakubo et al. | |
| 2012/0156523 A1 | 6/2012 | Seki et al. | |
| 2012/0164488 A1 | 6/2012 | Shin et al. | |
| 2012/0170152 A1 | 7/2012 | Sonobe et al. | |
| 2012/0171369 A1 | 7/2012 | Koike et al. | |
| 2012/0175243 A1 | 7/2012 | Fukuura et al. | |
| 2012/0189872 A1 | 7/2012 | Umezawa et al. | |
| 2012/0196049 A1 | 8/2012 | Azuma et al. | |
| 2012/0207919 A1 | 8/2012 | Sakamoto et al. | |
| 2012/0225217 A1 | 9/2012 | Itoh et al. | |
| 2012/0251842 A1 | 10/2012 | Yuan et al. | |
| 2012/0251846 A1 | 10/2012 | Desai et al. | |
| 2012/0276417 A1 | 11/2012 | Shimokawa et al. | |
| 2012/0308722 A1 | 12/2012 | Suzuki et al. | |
| 2013/0040167 A1 | 2/2013 | Alagarsamy et al. | |
| 2013/0071694 A1 | 3/2013 | Srinivasan et al. | |
| 2013/0165029 A1 | 6/2013 | Sun et al. | |
| 2013/0175252 A1 | 7/2013 | Bourez | |
| 2013/0209835 A1* | 8/2013 | Qui et al. | 428/829 |
| 2013/0216865 A1 | 8/2013 | Yasumori et al. | |
| 2013/0230647 A1 | 9/2013 | Onoue et al. | |
| 2013/0286802 A1* | 10/2013 | Kiely | 369/13.33 |
| 2013/0314815 A1 | 11/2013 | Yuan et al. | |
| 2014/0011054 A1 | 1/2014 | Suzuki | |
| 2014/0044992 A1 | 2/2014 | Onoue | |
| 2014/0050843 A1 | 2/2014 | Yi et al. | |
| 2014/0151360 A1 | 6/2014 | Gregory et al. | |

OTHER PUBLICATIONS

Sasaki, J. and F. Matsubara, Magnetic properties of mesoscopic ultrathin magnetic films with uniaxial anisotropy, J. Appl. Phys., vol. 87, No. 6, Mar. 15, 2000. pp. 3018-3022.

Thiele, J.-U., K. R. Coffey, M. F. Toney, J. A. Hedstrom, and A. J. Kellock, Temperature dependent magnetic properties of highly chemically ordered Fe55-xNixPt45L10 films, J. Appl. Phys., vol. 91, No. 10, May 15, 2002, pp. 6595-6600.

Cuccoli, Allesandro, Tommaso Roscilde, Valerio Tognetti, Ruggero Vais and Paola Verrucchi, Anisotropy and Ising-type transition of the S=5/2 two-dimensional Heisenberg antiferromagnet Mn-formate di-Urea, American Institute of Physics, J. Appl. Phys., vol. 93, No. 10, Parts 2 & 3, May 15, 2003, pp. 7637-7639.

Victora, R. H., Xi Chen and Tao Qu, Temporal Fluctuations of Magnetic Anisotropy and their Impact on HAMR Media Noise, The Center for Micromagnetics and Information Technologies, Aug. 18, 2010.

* cited by examiner

Low Granular Packing Fraction
Poor DC Noise

High Granular Packing Fraction
Good DC Noise

Simulation results with no field reference 600

Simulation results with field reference representing a capping layer 650

Light regions 610
(indicate alignment with externally applied field)

Dark regions 620
(indicate mis-alignment with externally applied field)

ENERGY ASSISTED MAGNETIC RECORDING MEDIUM CAPABLE OF SUPPRESSING HIGH DC READBACK NOISE

CROSS REFERENCE TO RELATED APPLICATION

This application is a divisional of U.S. patent application Ser. No. 13/042,840, filed on Mar. 8, 2011, which is hereby incorporated by reference in its entirety.

TECHNICAL FIELD

Embodiments described herein relate to the field of disk drives, and, in particularly, to perpendicular magnetic recording disks used in energy-assisted magnetic recording drives.

BACKGROUND

In energy-assisted magnetic recording (EAMR), the recording medium is locally heated to decrease the coercivity of the magnetic material during write operations. The local area is then rapidly cooled to retain the written information. This allows for magnetic write heads to be used with high coercivity magnetic materials. The heating of a local area may be accomplished by, for example, a heat or thermal source such as a laser. As such, one type of energy-assisted magnetic recording is heat assisted magnetic recording (HAMR). HAMR may also sometimes be referred to as thermally assisted magnetic recording (TAMR) or optically assisted magnetic recording (OAMR).

Conventional HAMR media is typically composed of a substrate, a heat sink layer, seed and nucleation layers, and a magnetic recording layer. Desirable properties of the magnetic recording layer in HAMR media include a moderate Curie temperature and a uniform, well-segregated, high magnetic anisotropy grain structure with highly developed crystallographic texture. Even with a magnetic recording layer that exhibits these properties, HAMR media may still suffer from high DC read back noise level during the read back process. The high DC read back noise level is an intrinsic characteristic of signal-layer HAMR media, and this noise level is expected to increase as the size of the reader element shrinks.

Multi-layer HAMR media structures have been explored and discussed, for example, in U.S. Pat. No. 7,678,476 B2 to Weller et al. (hereinafter "Weller"). In Weller, an HAMR media structure with a capping layer on top of the magnetic recording layer is proposed. The capping layer in Weller has a Curie temperature lower than that of the magnetic recording layer. The purpose of this capping layer in Weller is to provide magnetic stabilization to the lower magnetic recording layer at storage temperatures. This capping layer in Weller, however, does not address the high DC read back noise level during read back of the media.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

Embodiments of a perpendicular magnetic recording (PMR) disk for energy-assisted magnetic recording (EAMR) are described. The PMR disk structure includes a capping layer disposed above a magnetic recording layer to reduce the DC read back noise during the read back process, and an exchange coupling layer between the capping layer and the magnetic recording layer to partially exchange decouple these two layers. The addition of the capping layer also improves transition jitter on the trailing edge of the thermal spot in write operations during the refreezing process.

Figure 1:
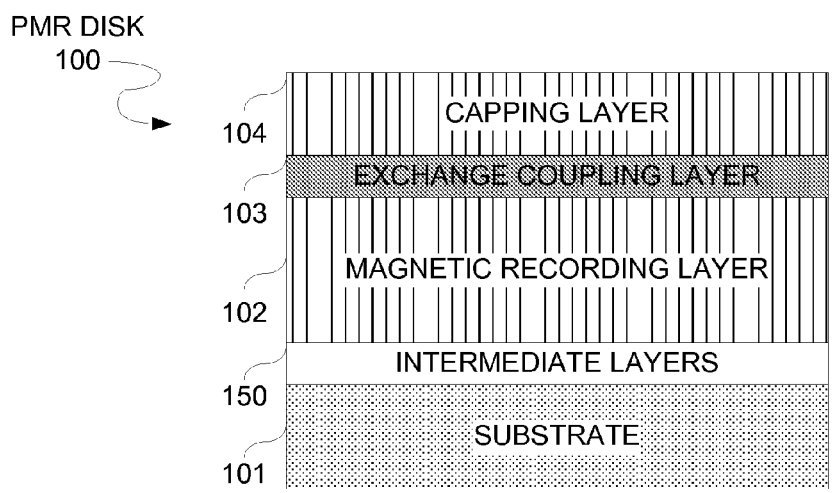
FIG. 1 illustrates a cross sectional view of a perpendicular magnetic recording (PMR) disk according to one embodiment of the present invention.

FIG. 1 illustrates a cross-sectional view of one embodiment of a PMR disk 100 to be used in an EAMR drive. The PMR disk 100 includes a capping layer 104 disposed above a magnetic recording layer 102. The material used for the capping layer 104 is selected to have a greater Curie temperature and a lower anisotropy ($K_u$) than that of the magnetic recording layer 102. The lower $K_u$ material selected for the capping layer 104 has the physical properties of reduced grain boundaries and a higher granular packing fraction than the material used in the magnetic recording layer 102. These physical properties of the capping layer 104 yield a greater intergranular lateral exchange coupling than that in magnetic recording layer 102. In one embodiment, the granular packing fraction of the lower $K_u$ material in the capping layer 104 is greater than 60%. By selecting the material used for the capping layer 104 to have a greater Curie temperature than the material used in the magnetic recording layer 102, the capping layer 104 remains magnetized during the refreezing process of write operations.

The magnetic recording layer 102 of PMR disk 100 is made of a high $K_u$ material that has a lower Curie temperature than that of the material used in the capping layer 104. In one embodiment, the high $K_u$ material selected for the magnetic recording layer 102 has the physical properties of highly segregated grain boundaries and a granular packing fraction of 60% or less. This results in a low inter-granular lateral exchange coupling between grains in the high $K_u$ material of the magnetic recording layer 102.

The PMR disk 100 further includes an exchange coupling layer 103 disposed between the magnetic recording layer 102 and the capping layer 104. One purpose of the exchange coupling layer 103 is to partially decouple the grains of the high $K_u$ material in the magnetic recording layer 102 from the grains of the low $K_u$ material in the capping layer 104 such that the higher Curie temperature of the material in the capping layer 104 does not significantly affect the Curie point of the material in the magnetic recording layer 102. Additional information and embodiments of PMR disk 100 are discussed in further detail below.

Figures 2A, 2B:
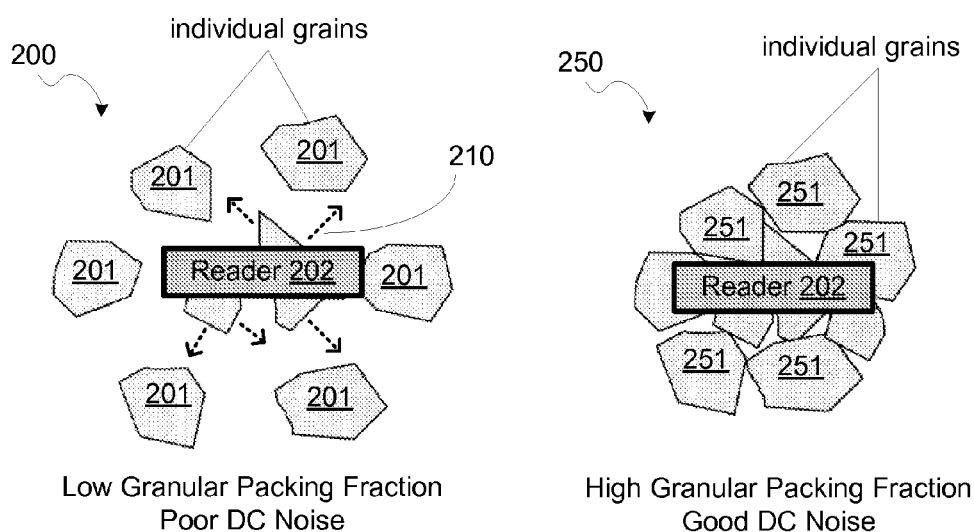
FIG. 2A illustrates the effects of a low granular packing fraction in PMR media during the read back process.
FIG. 2B illustrates the effects of a high granular packing fraction in PMR media during the read back process.

FIG. 2A illustrates the geometric effects on the read back process from a top planar view 200 of a high $K_u$ material with a low granular packing fraction in a PMR medium. In high $K_u$ material such as those selected for the magnetic recording layer 102, significant segregation of grain boundaries persists. As a result, because of the reduced intergranular magnetic exchange coupling, the magnetization in individual grains 201 are given latitude to change direction more independently from that of neighboring grains. Dispersion of magnetization in media grains 201 within the reader element 202 width during the read back process can create magnetic fluctuations. These magnetic fluctuations contribute significantly to the DC read back noise of the read back signal detected by the reader element 202. If the DC read back noise is significant enough, the read back element 202 may read back erroneous information from the magnetic recording layer 102.

The presence of a capping layer 104 made of a low $K_u$ material with a high granular packing fraction disposed above the magnetic recording layer 102 reduces this DC read back noise during the read back process. In FIG. 2B, a top planar view 250 of a PMR medium with a high granular packing fraction during the read back process shows that the higher granular packing fraction limits the lateral movement of grains within the reader element 202 width. Because of the close proximity of adjacent grains in the low $K_u$ material, individual grains 251 are given less latitude to change magnetization orientation independently from its neighbors' grain. Less magnetization dispersion within the width of the reader element 202 during the read back process results in less magnetic fluctuations which, in turn, reduces the component of DC read back noise in the read back signal detected by the reader element 202. Thus, the presence of a capping layer 104 that is made of a low $K_u$ material with high granular packing fraction disposed above the magnetic recording layer 102 yields a more reliable PMR medium that is less prone to DC read back noise.

Figure 3A:
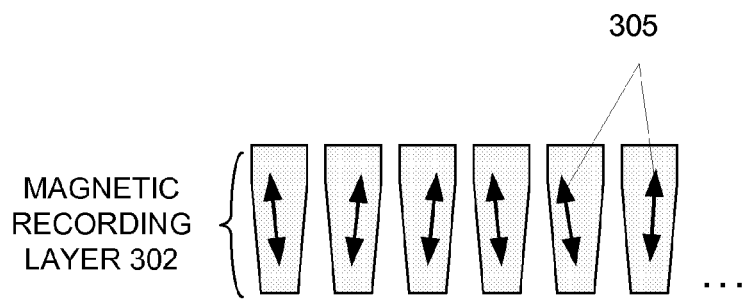
FIG. 3A illustrates the magnetic dispersion in a PMR medium without a capping layer.

In addition to reducing the DC read back noise, the low $K_u$ material used in capping layer 104 may also serve to reduce the magnetic dispersion inherent in the magnetic recording layer 102 by acting as an orientation reference to align the magnetic orientation in the grains of the magnetic recording layer 102. FIG. 3A illustrates the anisotropy axis of the magnetic orientation 305 in the grains of a magnetic recording layer 302 without a capping layer 104. Due to the segregation of gains of the high $K_u$ material used in the magnetic recording layer 102, and the inherent dispersion in the crystallographic growth orientation, the net magnetic orientation 305 may not be aligned perpendicular to the planar surface of the recording medium. This misalignment causes magnetic dispersion along the planar surface and reduces the magnitude of the read back signal level detected during the read back process.

Figure 3B:
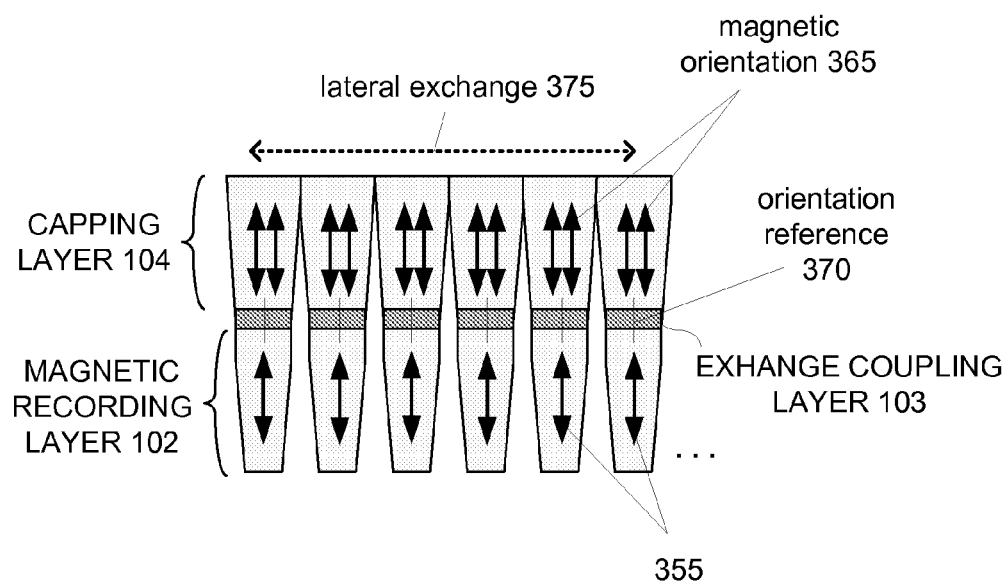
FIG. 3B illustrates the magnetic alignment in a PMR medium with a capping layer according to one embodiment of the present invention.

FIG. 3B illustrates the magnetic orientation 355 of grains in the magnetic recording layer 102 with a capping layer 104. Adjacent grains in the low $K_u$ material used in the capping layer 104 provide lateral exchange coupling 375 to one another to align the magnetic orientation 365 of grains in the capping layer 104. This magnetic alignment is then coupled through the exchange coupling layer 103 to the grains of the magnetic recording layer 102 below to provide an orientation reference 370 to improve alignment in the grains below. As a result, magnetic dispersion along the planar surface of the recording medium is reduced because the magnetic orientation 355 of grains in the magnetic recording layer 102 is more aligned perpendicular to the planar surface of the recording medium than the case without the capping layer 104. By both reducing the DC read back noise and increasing the magnitude of the detected read back signal level during the read back process, the presence of the low $K_u$ material used in capping layer 104 may yield an overall improvement in the signal-to-noise (SNR) ratio of the read back signal and provides for a higher quality PMR medium.

Figure 4:
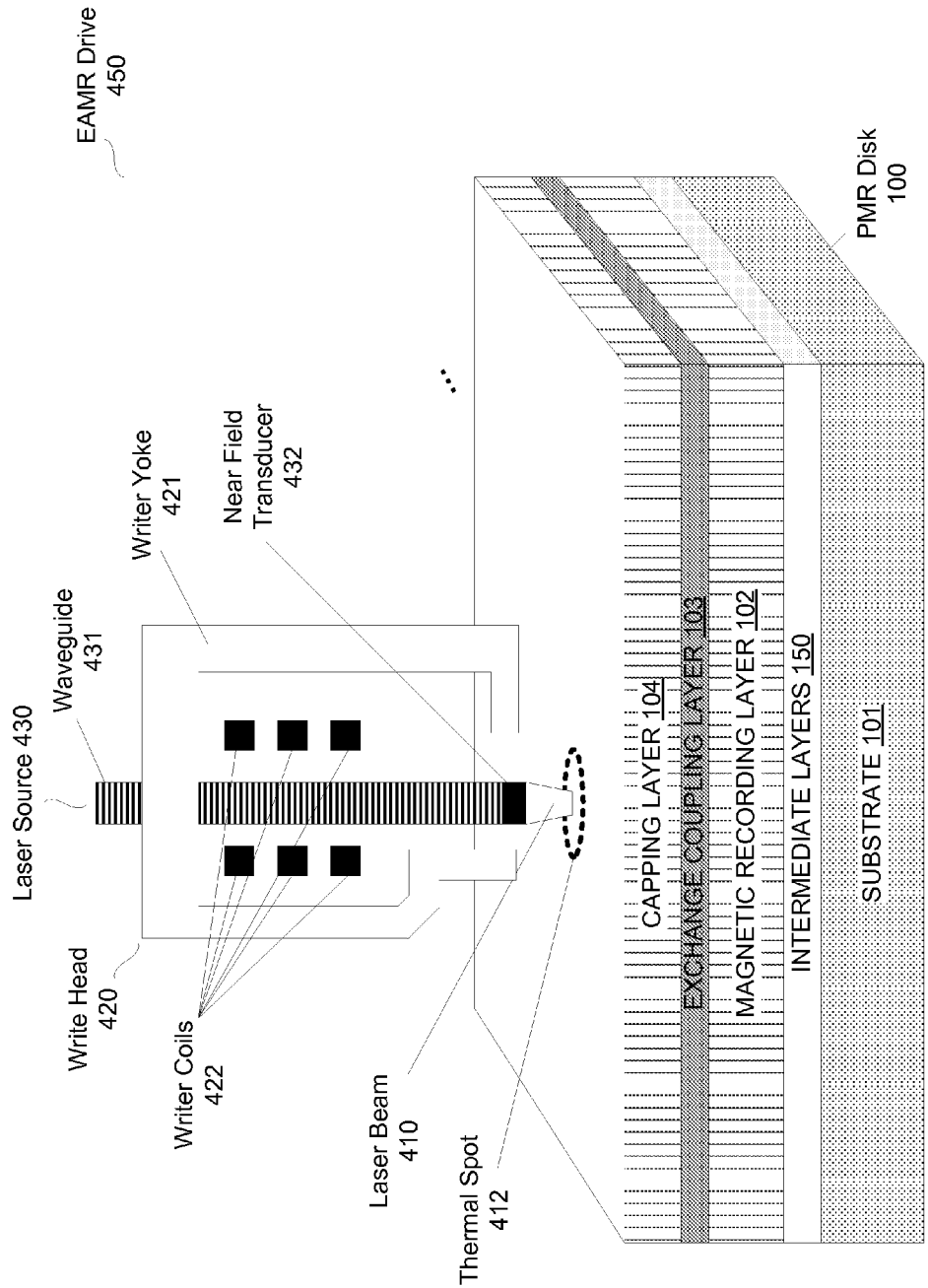
FIG. 4 illustrates a cross sectional view of a write head, a laser source, and a PMR disk in an EAMR disk drive system according to one embodiment of the present invention.

FIG. 4 illustrates an EAMR drive 450 according to one embodiment of the present invention. The EAMR drive 450 includes the components of a write head 420 (cross-sectional view shown), a laser source 430, and a PMR disk 100. The PMR disk 100 may have a substrate 101, intermediate layers 150, a magnetic recording layer 102, an exchange coupling layer 103, and a capping layer 104 made of a material selected to have a Curie temperature greater than that of the material used in the magnetic recording layer 102.

During a write operation, the laser beam 410 produces a thermal spot 412 on PMR disk 100 to heat a localized region of the magnetic recording layer 102. One of the key limiters to linear density performance of EAMR drive systems is the refreezing process on the trailing edge of the thermal spot 412. The refreezing process refers to the fixing of the magnetic orientation in the grains of the magnetic recording layer 102. During a write operation, when the magnetic recording layer 102 passes back down through its Curie point as the thermal spot 412 moves away, the randomized state of the magnetic orientation in the grains of the magnetic recording layer 102 has the potential to add to media jitter. By providing a capping layer 104 made of a material selected to have a greater Curie temperature than that of the material in the magnetic recording layer 102, the randomization of magnetic orientation in the grains of the magnetic recording layer 102 can be reduced during the refreezing process, and the linear density performance of EAMR drive systems can be improved.

Figure 5A:
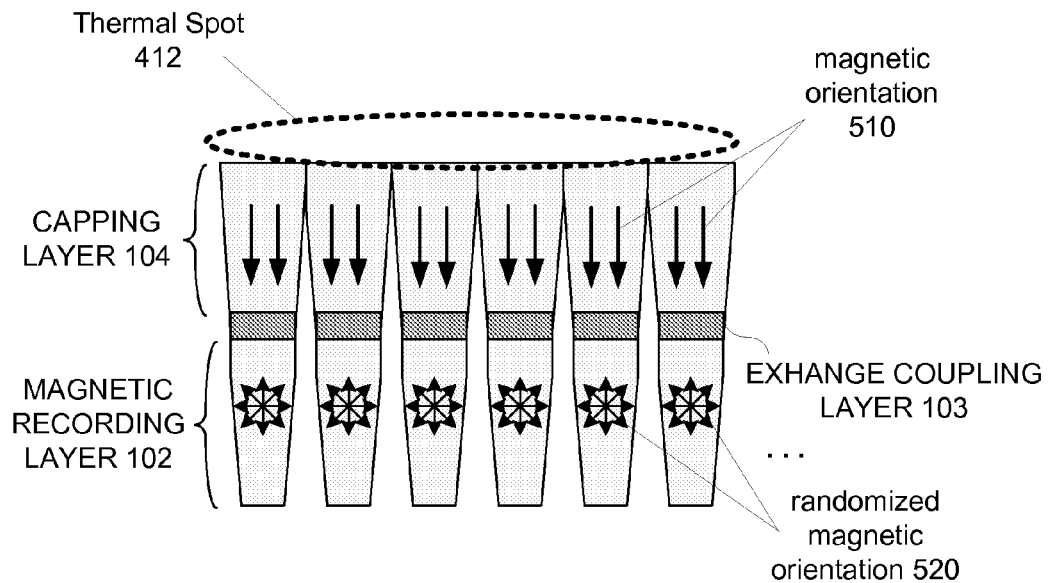
FIG. 5A illustrates the magnetic orientation of a PMR medium under a thermal spot according to one embodiment of the present invention.

In accordance with one embodiment, the thermal spot 412 may have a temperature between the Curie temperature of the material used in the magnetic recording layer 102 and the Curie temperature of the material used in the capping layer 104. In a particular embodiment, the thermal spot 412 may have a peak temperature in a range of 500 K to 900 K. The effect of the thermal spot 412 having a temperature that is between the Curie temperatures of the material used in the magnetic recording layer 102 and the material used in the capping layer 104 is shown in FIG. 5A. When a localized region of the PMR disk 100 is heated under the thermal spot 412, the grains in the capping layer 104 remains magnetized and maintains its magnetic orientation 510 because the material used in the capping layer 104 has not reached its Curie point. Meanwhile, the material in the magnetic recording layer 102, having been heated above its Curie point, is in a randomized state and has a randomized magnetic orientation 520.

Figure 5B:
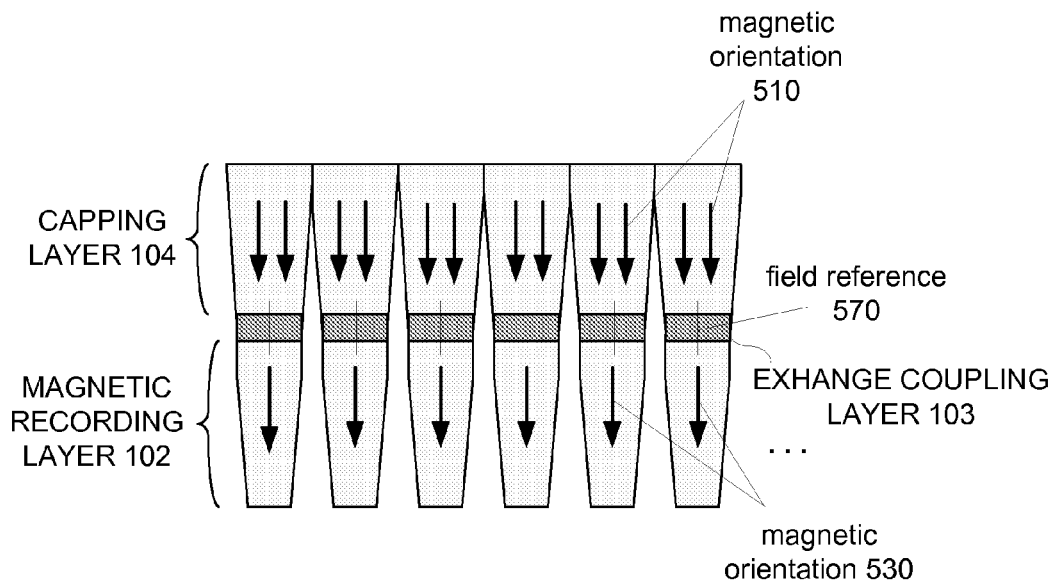
FIG. 5B illustrates the magnetic orientation of a PMR medium during the refreezing process according to one embodiment of the present invention.

As the thermal spot 412 moves away from the heated localized region, the material in the magnetic recording layer 102 is cooled back down to below its Curie point on the trailing edge of the thermal spot 412. During this refreezing process as shown in FIG. 5B, the magnetic orientation 510 of the grains in the capping layer 104 is coupled through the exchange coupling layer 103 to the grains in the magnetic recording layer 102 below. The magnetic orientation 510 in the capping layer 104 provides a field reference 570 to assist the grains in the magnetic recording layer 102 to re-align its magnetic orientation 530 parallel to an applied field. This field reference 570 provided by the capping layer 104 reduces the randomization in the magnetic orientation 530 of the grains in the magnetic recording layer 102 during the refreezing process to reduce transition jitter on the trailing edge of the thermal spot 412. By reducing the transition jitter during the refreezing process, the presence of a capping layer 104 made of a material with a higher Curie temperature than that of the material in the magnetic recording layer 102 can improve the linear density performance of EAMR drive systems.

Figure 6A:
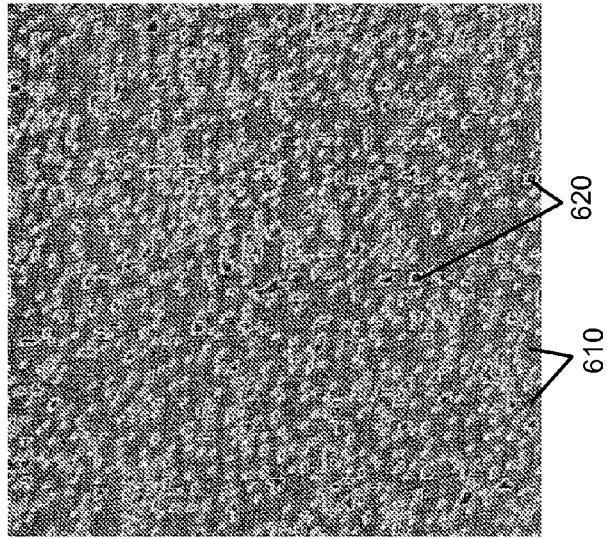
FIG. 6A illustrates simulation results with no field reference of the magnetic orientation of a PMR medium during the refreezing process.
Figure 6B:
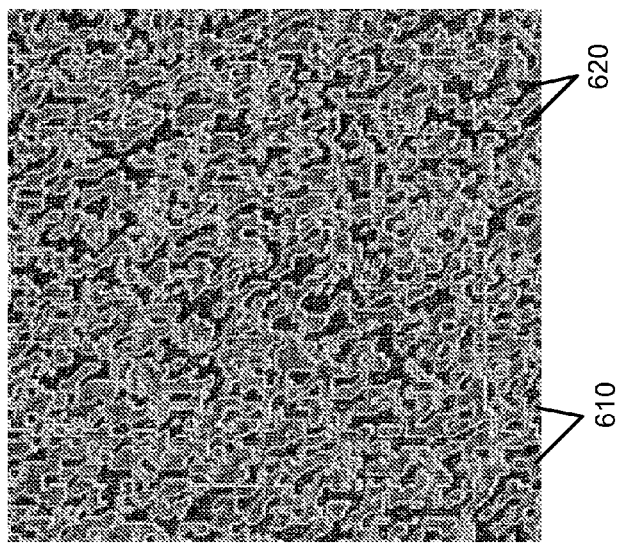
FIG. 6B illustrates simulation results with a field reference of the magnetic orientation of a PMR medium during the refreezing process according to one embodiment of the present invention.

Simulation results of the effects of a capping layer 104 made of a material with a higher Curie temperature than that of the material in the magnetic recording layer 102 during the refreezing process in a PMR medium using an (sing spin model are shown in FIG. 6A and FIG. 6B. The phase transition of the magnetic recording material during the refreezing process is a thermodynamically path dependent process and therefore depends on intermediate transition states over time. The capping layer 104 is modeled by the presence of a field reference in the simulations. FIG. 6A shows the simulation results with no field reference 600 of the magnetic alignment of a PMR recording medium during the refreezing process. Light regions 610 represent magnetic orientations that are aligned with or parallel to an externally applied field. Dark regions 620 represent magnetic orientations that are not aligned with or anti-parallel to the externally applied field. FIG. 6B shows the simulation results with a field reference representing a capping layer 650 of the magnetic alignment of a PMR recording medium at the same point in time during the refreezing process as in FIG. 6A.

As shown in FIG. 6A, the distribution of dark regions 620 is fairly even with the distribution of light regions 610 without the presence of a field reference. In contrast, the distribution of dark regions 620 in FIG. 6B is significantly less when a field reference is present. The simulation results with no field reference 600 shows that the lack of a field reference, which represents the lack of a capping layer, gives rise to a magnetic state that has higher randomization as compared to the PMR medium with a capping layer 104. In the simulation results with field reference representing a capping layer 650, the spins in the magnetic volume simulated in the PMR medium refreeze parallel to the applied external field in higher populations than that of the PMR medium that lacks such a capping layer 104. With less randomization in the magnetic orientations of the magnetic recording layer 102 during the refreezing process, transition jitter on the trailing edge of the thermal spot 412 is reduced.

Referring back to FIG. 1, additional embodiments of PMR disk 100 are as follows. The capping layer 104 of PMR disk 100 may have a thickness in the range of 1 nanometers (nm) to 12 nm. In one particular embodiment, the capping layer 104 has a thickness of 3 nm. The composition of the capping layer 104 may include one of FePt, CoPt, CoPd, CoFePd, CoCrPt, or CoCr. Alternatively, the capping layer 104 may be made of an iron-type alloy (FeX), a cobalt-platinum-type alloy (CoPtX), an iron-platinum-type alloy (FePtX), or a cobalt-type alloy (CoX), where 'X' may include one of the segregants of Ni, Cr, Co, B, C, Ag, Cu, Ru, Re, Ir, or metal or non-metal oxides.

By selecting different segregants or different combinations of segregants in the composition of the capping layer 104, the Curie temperature of the capping layer 104 may be specifically tailored because Curie temperatures are material dependent. The capping layer 104 may be made of a material that has a Curie temperature that is 20 K to 600 K greater than the Curie temperature of the material used in the magnetic recording layer 102. In one embodiment, the capping layer 104 is made of a material that has a Curie temperature that is 100 K greater than the Curie temperature of the material used in the magnetic recording layer 102. In a particular embodiment, the material used in the capping layer 104 has a Curie temperature of approximately 745 K.

In one embodiment, the magnetic recording layer 102 may have a thickness in a range of 4 to 15 nm. In a particular embodiment, the magnetic recording layer 102 has a thickness of approximately 10 nm. The magnetic recording layer 102 may be made of, for example, FePt, FePd, FePtPd, CoPt, or other ordered inter-metallic L10 alloy with a Curie temperature in the range of 500 to 800 degrees Kelvin (K). In an exemplary embodiment, the magnetic recording layer is made of FePt and has a Curie temperature of approximately 645 K. Other materials that may be used for the magnetic recording layer include ferromagnetic alloys such as FePdX, FePtPdX, or FePtX alloys, where 'X' may include one of the segregants of C, $SiO_2$, $TiO_2$, Cu, B, MgO, Ni, NiO, Cr, $Cr_2O_3$, CrO, $Al_2O_3$, Co, or CoO. In an alternative embodiment, 'X' may also include a combination of these segregants. As noted above, Curie temperatures are material dependent. Hence, the Curie temperature of the magnetic recording layer 102 may also be tailored to be less than the Curie temperature of the capping layer 104 by a specific amount, for example, 100 K, by selecting different segregants or different combinations of the segregants listed above to be used in the magnetic recording layer 102.

The exchange coupling layer 103 of PMR disk 100 may have a thickness in a range of 0.3 nm to 2 nm. In one exemplary embodiment, the exchange coupling layer 103 has a thickness of 1 nm. The exchange coupling layer 103 may be made of a variant of a ruthenium (Ru) or a ruthenium-cobalt (RuCo) alloy. The exchange coupling layer 103 may also be made of Cr, CoCr, CoCrB, MgO, TiN, TiC, Cu, Re, Pt, Pd, Ir, Ag, Ta, Nb, or V.

In another embodiment, the PMR disk 100 may also include additional or intervening layers that are not shown. The substrate 101 may be made of, for example, a metal, metal alloys such as nickel phosphorous (NiP), glass, or other substrate materials known in the art including polymers and ceramics. The intermediate layers 150 disposed above the substrate 101 may include a heat sink layer. The heat sink layer may be made of copper (Cu). Other metals or heat conductive materials may be also used for the heat sink layer. In addition, the intermediate layers 150 may also include an underlayer, a seed layer made of, for example, tantalum (Ta), and nucleation layers made from one of, for example, Ta, chromium ruthenium (CrRu), or magnesium oxide (MgO). In an alternative embodiment, the intermediate layers 150 may have other compositions and additional intervening layers.

Referring back to FIG. 4, the EAMR drive 450 in the above description may be a heat assisted magnetic recording (HAMR) drive. HAMR may also sometimes be referred to as thermally assisted magnetic recording (TAMR) or optically assisted magnetic recording (OAMR). The write head 420 may include a writer yoke 421 and writer coils 422. The components of the laser source 430 may include a waveguide 431 and a near-field transducer (NFT) 432. Techniques in generating a laser beam 410 and focusing the laser beam 410 with NFT 432 are known in the art, and thus, are not described in particular details. In another embodiment, alternative energy sources may be used in place of laser source 430, and other energy beams from other energy sources may be used to produce the thermal spot 412.

It should be noted that the apparatus and methods discussed herein may be used with various types of drives. In one embodiment, for example, the apparatus and methods discussed herein may be used with a non-EAMR disk drive such as a PMR drive with inductive write heads.

The terms "above," "under," and "between" and "on" as used herein refer to a relative position of one media layer with respect to other layers. As such, for example, one layer disposed above or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Additionally, the relative position of one layer with respect to other layers is provided assuming operations are performed relative to a substrate without consideration of the absolute orientation of the substrate.

In the foregoing specification, the present invention has been described with reference to specific exemplary embodiments thereof. It will, however, be evident that various modifications and changes may be made thereto without departing from the broader scope of the embodiments of the invention as set for in the appended claims. The specification and drawings are, accordingly, to be regarded in an illustrative rather than a restrictive sense.

What is claimed is:

1. An energy assisted magnetic recording (EAMR) drive, comprising:
   a perpendicular magnetic recording (PMR) disk comprising:
   a magnetic recording layer disposed above a substrate; and
   a capping layer disposed above the magnetic recording layer, wherein the capping layer has a different Curie temperature than the magnetic recording layer; and
   means for reducing a DC read back noise of the EAMR drive using the capping layer, wherein the capping layer remains magnetized during a refreezing process of a write operation.

2. The EAMR drive of claim 1, further comprising:
   an energy source to generate a thermal spot on the PMR disk; and
   means for reducing jitter on a trailing edge of the thermal spot using the capping layer.

\* \* \* \* \*